(12) United States Patent
Ylitalo et al.

(10) Patent No.: US 7,203,246 B2
(45) Date of Patent: Apr. 10, 2007

(54) METHOD OF ESTIMATING A CHANNEL, AND A RADIO SYSTEM

(75) Inventors: Juha Ylitalo, Oulu (FI); Esa Tiirola, Oulu (FI); Matti Kiiski, Oulunsalo (FI)

(73) Assignee: Nokia Corporation, Espoo (FI)

( * ) Notice: Subject to any disclaimer, the term of this patent is extended or adjusted under 35 U.S.C. 154(b) by 813 days.

(21) Appl. No.: 10/329,760

(22) Filed: Dec. 27, 2002

(65) Prior Publication Data
US 2003/0198201 A1 Oct. 23, 2003

(30) Foreign Application Priority Data

Dec. 28, 2001 (FI) .................................. 20012587
Aug. 30, 2002 (FI) .................................. 20021554

(51) Int. Cl.
*H04B 7/02* (2006.01)

(52) U.S. Cl. ...................... 375/267; 375/144; 375/147; 375/316

(58) Field of Classification Search ................ 375/140, 375/144, 148, 219, 232, 267, 316, 342, 346, 375/356, 130, 141, 147, 229, 259, 260, 340, 375/354, 310, 328, 329, 335, 343
See application file for complete search history.

(56) References Cited

U.S. PATENT DOCUMENTS

| 6,108,565 | A |   | 8/2000 | Scherzer |   |
|---|---|---|---|---|---|
| 6,411,649 | B1 | * | 6/2002 | Arslan et al. ................ | 375/232 |
| 2001/0043642 | A1 | * | 11/2001 | Hirata ........................ | 375/144 |
| 2002/0128027 | A1 | * | 9/2002 | Wong et al. ................. | 455/513 |

FOREIGN PATENT DOCUMENTS

| EP | 1 065 800 A1 | * | 7/1999 |
| EP | 1 133 072 A1 | * | 8/2000 |
| EP | 1 065 800 A1 |   | 1/2001 |

OTHER PUBLICATIONS

"Optimizing the Number of Dedicated Pilot Symbols for Forward Link in W-CDMA Systems", Usuda et al, VTC 2000-Spring. 2000 IEEE 51st Vehicular Technology Conference Proceedings, Tokyo, Japan, May 15-18, 2000, vol. 3 of 3. Conf. 51.

"3GPP TS 25.211 V3.7.0 (Jun. 2001) 3rd Generation Partnership Project Technical Specification Group Radio Access Network Physical Channels and Mapping of Transport Channels Onto Physical Channels (FDD)", 3GPP TS 25.211 V3.7.0, XX, XX, vol. 3.7.0, Jun. 2001, pp. 1-45, XP002902457.

* cited by examiner

*Primary Examiner*—Pankaj Kumar
*Assistant Examiner*—Naheed Ejaz
(74) *Attorney, Agent, or Firm*—Squire, Sanders & Dempsey, LLP.

(57) ABSTRACT

The invention relates to a method of estimating a downlink channel in a radio system, and to a radio system. The method includes transmitting a common pilot signal and a user-specific pilot signal, of which channel estimates are formed. A channel estimate for the user-specific channel that has transmitted the user-specific pilot signal is formed of said channel estimates by selecting an appropriate scaling factor. The quality of the user-specific channel estimation and thus also the performance of the radio system are improved by the invention.

28 Claims, 5 Drawing Sheets

METHOD OF ESTIMATING A CHANNEL, AND A RADIO SYSTEM

FIELD

The invention relates to a method of estimating a channel in a radio system, and to a radio system.

BACKGROUND

As the number of users of cellular radio systems increases and rapid data transmission becomes more and more common in the systems, it becomes essentially important to increase the capacity of the system by improving the system performance.

One way to increase the capacity is to use one or more adaptive antenna arrays instead of sector antennas. An antenna array comprises at least two antenna elements correlated with each other, the signals of which can be processed independently from each other. By weighting the signals of the antenna elements of an adaptive antenna array it is possible to form radiation patterns, the signal power of which can be allocated user-specifically to each unit of user equipment. Thus, the signal related to the radiation pattern transmitted user-specifically also comprises user-specific coding.

In an ideal case, the transmitted signal and the received signal are identical. In practice, however, this is not always the case, but for instance fading and distortion of the signal occurs on the radio path. Particularly in the case of user equipment in a moving state, the used radio channel can change as the function of time and during each individual connection.

The changes in the signal caused by the radio path can be taken into account by performing channel estimation for the channels used. A known way to perform channel estimation is to generate an estimate of the impulse response of the radio channel and to equalize the received radio signals by using the received equalization data. When performing the equalization, it is essential that the antenna configuration of the array antenna and the antenna weightings remain the same as they were when the channel estimation was performed.

In the channel estimation, known signal sequences can be used. The channel estimate of user-specific channels is typically formed of a pilot sequence transmitted in a traffic channel.

In prior art, the effective power of the pilot sequences of the channels transmitted with user-specific radiation beams is low due to the restricted length of the pilot sequence and the restricted transmission power. Thus, the quality of the channel estimation can be low, which deteriorates the quality of the connection and the performance of the radio system.

BRIEF DESCRIPTION

An object of the invention is to provide an improved method of estimating a downlink channel and an improved radio system.

An aspect of the invention is an improved method of estimating a downlink channel in a radio system, comprising: transmitting a common pilot signal from the network part; transmitting from the network part a user-specific pilot signal in a user-specific channel; receiving the common pilot signal in user equipment; receiving the user-specific pilot signal in user equipment; generating an impulse response of the common pilot signal; and generating an impulse response of the user-specific pilot signal. The method is characterized by generating an impulse response of a user-specific channel, based on the impulse response of the common pilot signal and the impulse response of the user-specific pilot signal.

An aspect of the invention is a radio system comprising: a network part for forming a fixed infrastructure for the radio system; user equipment for forming a mobile infrastructure for the radio system; the network part comprising means for transmitting a common pilot signal; the network part comprising means for transmitting a user-specific pilot signal in a user-specific channel; the user equipment comprising means for generating an impulse response of the common pilot channel; the user equipment comprising means for generating an impulse response of the user-specific pilot signal. The radio system is characterized in that the user equipment further comprises impulse response means for generating an impulse response of the user-specific channel, based on the impulse response of the common pilot signal and the impulse response of the user-specific pilot signal.

Preferred embodiments of the invention are described in the independent claims.

The invention is based on the idea that a common pilot signal and a user-specific pilot signal are utilized in the user equipment, determination of the impulse response of the channel being performed separately for the two signals, and then the impulse response of the user-specific channel is generated, taking into account the impulse response of the common pilot signal and the impulse response of the user-specific pilot signal. By means of the method and the radio system according to the invention, the quality of the channel estimate for the user-specific channel is improved, and an improvement in the performance of the radio system is achieved, which increases the capacity of the radio system.

LIST OF FIGURES

The invention will now be described in more detail in connection with preferred embodiments, with reference to the attached drawings, of which FIG. 1 shows a simplified block diagram of the structure of a radio system;

DESCRIPTION OF EMBODIMENTS

The described embodiments can be applied to telecommunications systems. In the following, the embodiments are described by using the GPRS (General Packet Radio Service) radio system and the UMTS (Universal Mobile Telephone System) radio system as examples without being restricted to these, however.

Figure 1:
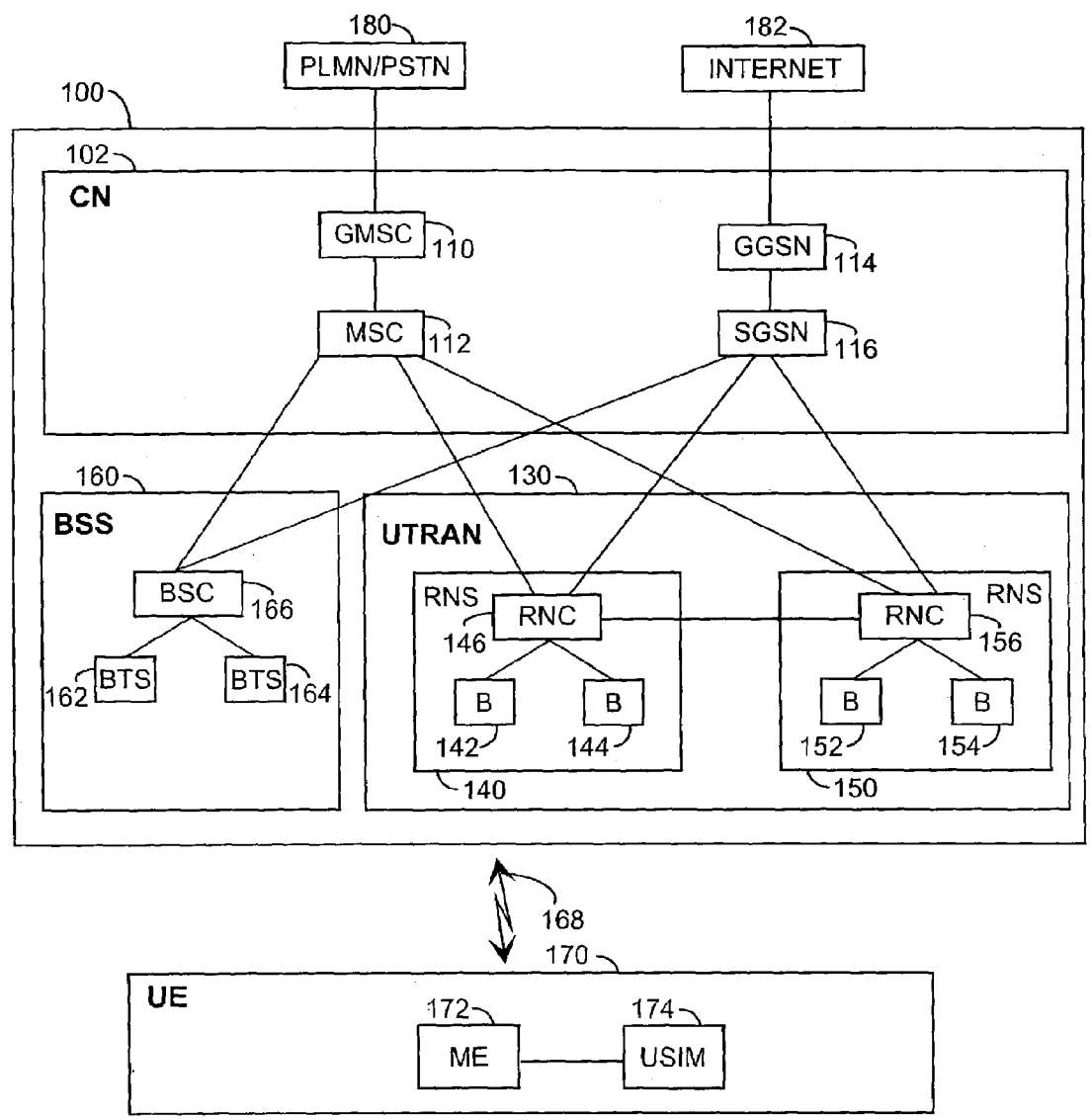

Let us first deal with FIG. 1, which illustrates the structure of a telecommunications system in a simplified manner at network element level. The structure and functions of the network elements are not described in detail, because they are as such generally known.

A telecommunications system can be divided into a network part 100 and user equipment 170. In addition, there may be a connection to external networks 180, such as to a public land mobile network (PLMN) and to a public switched telephone network (PSTN). Further, the network part can be connected to packet-switched networks, such as the Internet 182.

The network part 100 comprises the fixed infrastructure of a radio system, i.e. a core network (CN) 102, a radio access network UTRAN (UMTS Terrestrial Radio Access Network) 130 and a base station system (BSS) 160. A radio access network 130 is implemented by means of the WCDMA (Wideband Code Division Multiple Access) technique, a base station system 160 being implemented with the time division multiple access (TDMA) technique.

The user equipment 170 forms the mobile infrastructure of the radio system and is also known as a terminal, a subscriber terminal and a mobile phone.

The structure of the core network 102 corresponds to a combined structure of the GSM (Global System for Mobile Communication) and GPRS systems. The GSM network elements are responsible for establishing circuit-switched connections, and the GPRS network elements are responsible for establishing packet-switched connections; some of the network elements are, however, in both systems.

A mobile services switching center (MSC) 112 is the center point of the circuit-switched side of the core network 102. The same mobile services switching center 112 can be used to serve the connections of both the radio access network 130 and the base station system 160. The tasks of the mobile services switching center 112 include: switching, paging, user equipment location registration, handover management, collection of subscriber billing information, encryption parameter management, frequency allocation management, and echo cancellation.

A gateway mobile services switching centre (GMSC) 110 attends to the connections between the core network 102 and the external networks 180. The gateway mobile services switching centre 110 is located between the mobile services switching centre 112 and the external networks 180.

A serving GPRS support node (SGSN) 116 is the centre point of the packet-switched side of the core network 102. The main task of the serving GPRS support node 116 is to transmit and receive packets with the user equipment 170 supporting packet-switched transmission, using the radio access network 130 or the base station system 160. The serving GPRS support node 116 contains subscriber information and location information concerning the user equipment 170.

A gateway GPRS support node (GGSN) 114 is the packet-switched side counterpart to the gateway mobile services switching centre 110 of the circuit-switched side with the exception, however, that the gateway GPRS support node 114 must also be capable of routing traffic from the core network 102 to external networks 182, whereas the gateway mobile services switching centre 110 only routes incoming traffic.

The radio access network 130 is made up of radio network subsystems (RNS) 140, 150. Each radio network subsystem 140, 150 is made up of radio network controllers (RNC) 146, 156 and B nodes 142, 144, 152, 154. The term 'base transceiver station' is often used to refer to a B node.

The radio network controller 146 controls the B nodes 142, 144 under it. The radio network controller 146 is responsible for the following tasks: management of the radio resources of the B node 142, 144, intercell handover, frequency management, i.e. frequency allocation to the B nodes 142, 144, management of frequency hopping sequences, measurement of time delays in the uplink, implementation of the interface in operation and maintenance and management of power control. Further, antenna weights used in the beam forming can be defined in the radio network controller 146.

The B node 142, 144 comprises at least one transceiver, by means of which a WCDMA radio interface is implemented. Typically, a B node serves one cell, but such a solution is also feasible where the B node serves several sectored cells. The diameter of the cell can vary from a few meters to tens of kilometers. The B nodes 142, 144 are responsible for the following tasks, for example: calculation of TA (timing advance), measurements of the uplink, channel coding, encryption, decryption and frequency hopping.

The base station system 160 is formed of a base station controller (BSC) 166 and base transceiver stations (BTS) 162, 164. The base station controller 166 controls the base transceiver station 162, 164. The base station controller 166 is responsible for substantially the same tasks as the radio network controller 146.

The base station controller 162, 164 comprises at least one transceiver, each carrier of which has eight time slots, in other words the transceiver implements eight physical channels on each carrier. Typically, one base transceiver station 162, 164 serves one cell, but such a solution is also feasible where one base transceiver station 162, 164 servers several sectored cells. The base transceiver station 162, 164 attends to tasks corresponding to those of the B node 142, 144, 152, 154.

The user equipment 170 is formed of two parts: mobile equipment (ME) 172 and a UMTS subscriber identity module (USIM) 174. USIM 174 contains information related to the user and information related to information security in particular, for instance an encryption algorithm. The user equipment 170 contains at least one transceiver with which a radio connection 168 is implemented to the radio access network 130 or to the base station system 160. The user equipment 170 can contain at least two different subscriber identity modules.

Figure 2:
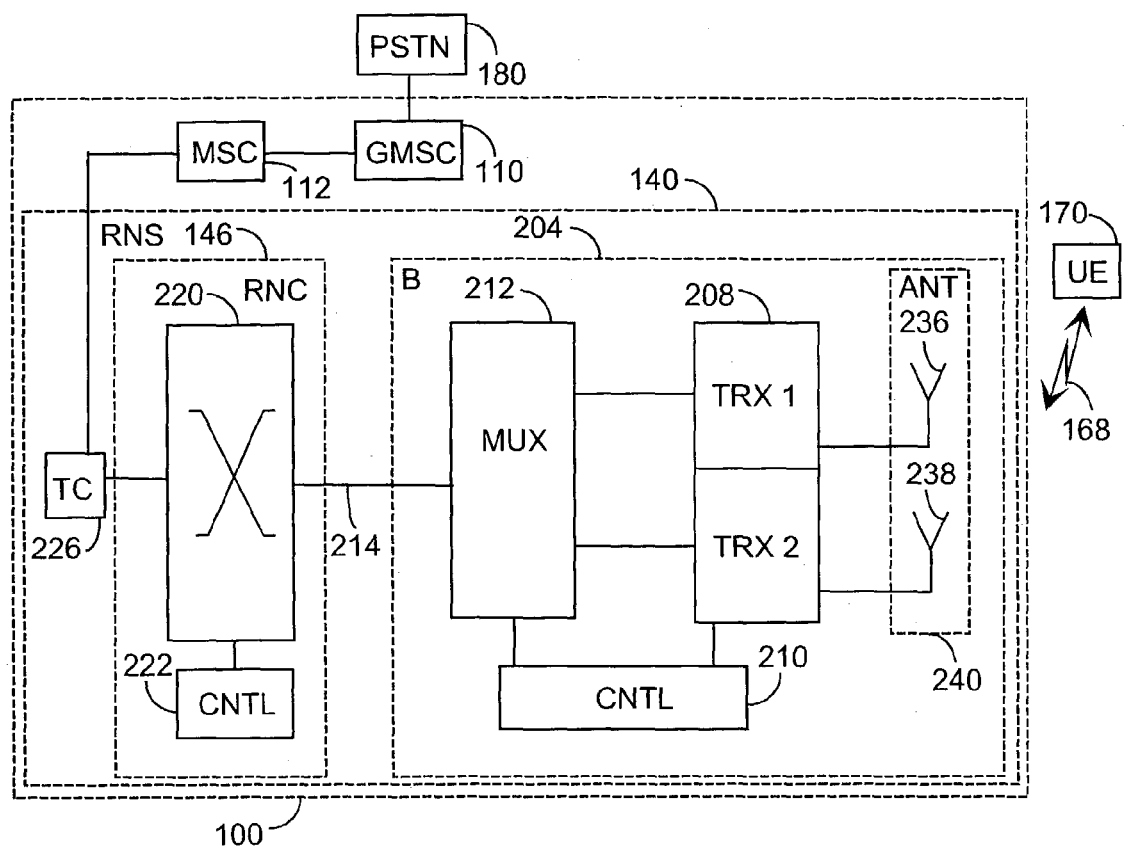
FIG. 2 shows a second simplified block diagram of the structure of a radio system.

FIG. 2 shows the structure of the radio network subsystem 140 of the radio access network 130 in more detail, but a corresponding structure can also illustrate the structure of the base station system 160. The radio network subsystem 140 comprises base transceiver stations 204, which correspond to the B nodes 142, 144 and the base transceiver stations 162, 164 of FIG. 1. Several base transceiver stations 204 are, in turn, controlled in a centralized manner by the radio network controller 146, which comprises a group switching field 220 and a control unit 222. The group switching matrix 220 is used for switching speech and data and connecting signaling circuits. A control unit 222 performs call control, mobility management, collection of statistical data, signaling and control and management of resources. The radio network subsystem 140 further comprises a transcoder 226, which converts different digital speech coding modes used between the public switched telephone network and a mobile telephone network to be compatible with each other, for example from the fixed network mode to another mode of a cellular radio network, and vice versa.

The base transceiver station 204 comprises a multiplexer unit 212, a transceiver unit 208, a control unit 210 and an array antenna 240. The traffic and control channels used by the transceiver unit 208 are positioned with the multiplexer 212 on one transmission connection 214. Further, the multiplexer unit 212 performs error-correction functions and possibly bit interleaving and deinterleaving.

The control unit 210 controls the operation of the transceiver unit 208 and the multiplexer 212. The control unit 210 defines for example the antenna weights of the array antenna 240.

The transceiver 208 comprises frequency converters for up-converting baseband signals to the radio frequency and down-converting radio-frequency signals to the baseband frequency. In addition, the transceiver comprises antenna amplifiers for amplifying signals, and duplex filters with which the signals that are received and the signals that are transmitted are separated from each other.

The transceiver 208 further comprises an A/D converter unit for sampling the signals received by the array antenna 240, and digital-analogue converters for converting the digital signals transmitted from the array antenna 240 to an analogue mode.

The transceiver 208 further comprises a baseband frequency part, which, in turn, comprises a digital signal processor, memory means, a microprocessor and software for performing for instance signal coding, decoding, and weighting of signals to be transmitted and of received signals. In addition, error-correction functions are performed in the baseband frequency part, and possibly also bit interleaving and deinterleaving.

An array antenna 240 forms a phased antenna array comprising at least two antenna elements 236, 238, with which a radio connection 168 to the user equipment 170 is implemented. In the aligned antenna array, the distance between the antenna elements 236, 238 is typically about half of the wavelength of the radio wave used in the radio system. The antenna elements 236, 238 can be configured to a uniform linear antenna array (ULA), whereby the correlation between the antenna elements 236, 238 depends linearly on their position in the array antenna 240 and on the properties of the radio channel, such as the angle distribution. In a planar antenna configuration, it is possible to form for instance a CA (Circular Array), in which the antenna elements are positioned at the same level, for instance on the periphery of a circle. Thus, a given part of the periphery of the circle is covered, for instance 120 degrees, even the full 360 degrees. In principle, also two-dimensional or even three-dimensional structures can be constructed of the above-mentioned uniplanar antenna structures. A two-dimensional structure is formed for instance by positioning ULA structures in parallel, whereby a matrix is formed of the antenna elements. In this application, the antenna elements 236, 238 are indicated with an index k, the values of which are determined by the limits $2 \leq k \leq M$ and $M>1$.

Figure 4:
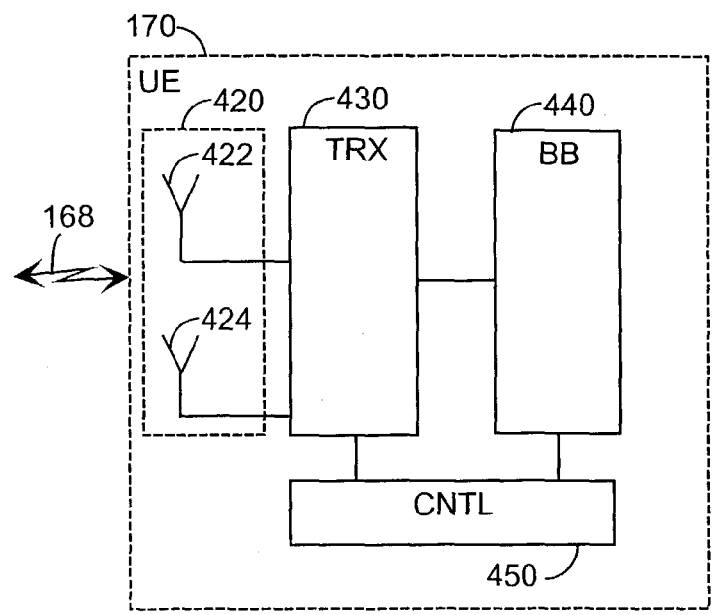
FIG. 4 shows a simplified block diagram of the structure of user equipment.

FIG. 4 shows the structure of the user equipment 170 by means of a block diagram. The user equipment 170 comprises a baseband frequency part 440 BB (Baseband), a transceiver 430, an antenna 422 and a control unit 450. Further, the user equipment 170 comprises a user interface and a source coding unit, which are not shown in FIG. 4.

The baseband frequency part 440 comprises signal processors and required memory means for processing signals transmitted to the transceiver 430 and signals received from the transceiver 430. Further, for instance spreading of a signal to be transmitted and despreading of the received signal are performed in the baseband frequency part 440.

The transceiver 430 comprises radio frequency parts where the received radio-frequency signal is converted to the baseband frequency and the baseband-frequency signal to be transmitted is converted to the radio frequency. Further, the transceiver 430 comprises amplifiers by means of which the signals transmitted with the antenna 422 are amplified and possibly phased in accordance with control commands given by the control unit 450. In addition, the transceiver 430 comprises analogue-digital converters for sampling signals received from the antenna 422. The transceiver 430 also comprises duplex filters by means of which the signal to be transmitted and the signal to be received are separated from each other.

The control unit 450 controls the operation of the transceiver 430 and of the baseband frequency part 440. The control unit 450 comprises a digital processor and memory means by means of which processes programmed in the control unit, for instance calculation procedures, can be executed.

The user equipment 170 comprises at least one antenna 422 for transmitting and receiving a signal 168. In one embodiment, the user equipment 170 comprises an antenna array 420 which comprises at least two antennas 422, 424.

Figure 3:
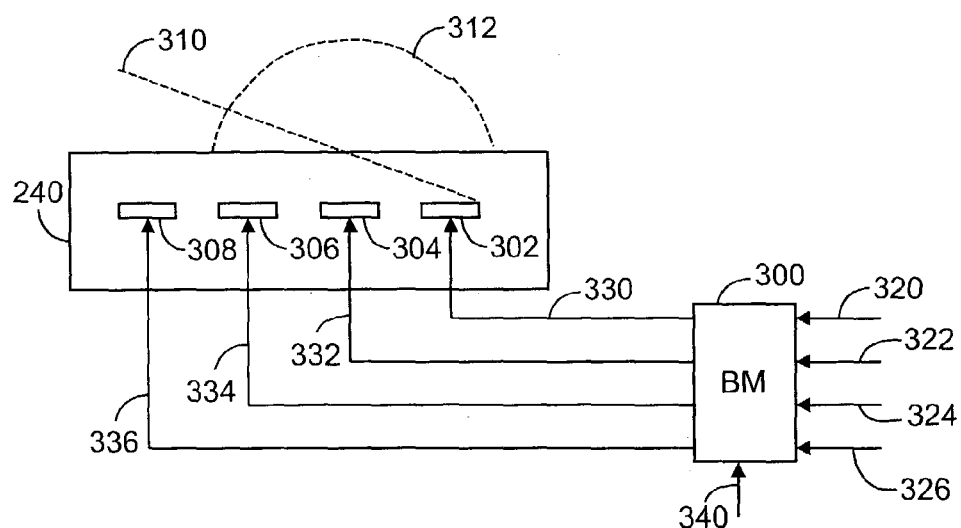
FIG. 3 shows an example of the structure of an antenna array.

FIG. 3 shows a simple example of beam forming means of the transceiver 208 of the base transceiver station 204. In a general meaning, beam forming refers to formation of a radiation pattern of an array antenna, in which the radiation pattern may be very complex. FIG. 3 shows an array antenna 240 with antenna elements 302 to 308, and a beam forming matrix 300. Signals 320 to 326 are fed to the beam forming matrix 300, which generates antenna signals 330 to 336. After this, the signals 330, 332, 336 can be taken to power amplifiers, with which the signal power is amplified for transmission. The power amplifiers are not shown in FIG. 3. Finally, the signals 330, 332, 334, 336 are taken to the antenna elements 302, 304, 306, 308 of the antenna array 240 to be transmitted to the radio path.

The beam forming matrix 300 can be located for instance in the baseband frequency part of the transceiver 208 of the base transceiver station 204. Weightings 340 directed at the signals 320 to 326 used for beam forming are brought to the beam forming matrix 300 for instance from the control unit 210 of the base transceiver station 204 or from the radio network controller 146 controlling the base transceiver station 204.

In a digital implementation, the signal 320 to 326 is typically divided in the baseband frequency part of the transceiver 208 into I and Q branches, after which the divided signal is multiplied by weighting coefficients. Weighting coefficients are typically of the form $Ae^{j\Phi}$, where A is amplitude and $\phi$ is phase difference. The phasing is achieved by defining the phase difference, which in the case of an antenna array changes linearly from one antenna to another. In signal phasing, the signal of the first antenna used as a reference antenna is usually not phased, and the phases of the signals of other antennas are changed proportioned to it in such a way that the phase difference $\phi$ increases antenna by antenna.

In a linear antenna array, the phase difference in the antenna element i compared to the first element of the array is proportional to the distance d of the antenna elements according to Formula $$\phi_i = \frac{2\pi}{\lambda} i \cdot d \cdot \sin\varphi, \; i = 0,1,2,3, \ldots, M-1 \tag{1}$$

where
$\lambda$=wavelength of the antenna signal (carrier wave),
M=number of antenna elements in the antenna array, d=distance between different antenna elements,
φ=angle at which the antenna beam is directed; and
i=antenna index (i=0 for reference antenna).

Beam forming can also be implemented with an analogue phase shift network, in which case the power amplifiers are positioned before the beam forming matrices.

Figure 6:
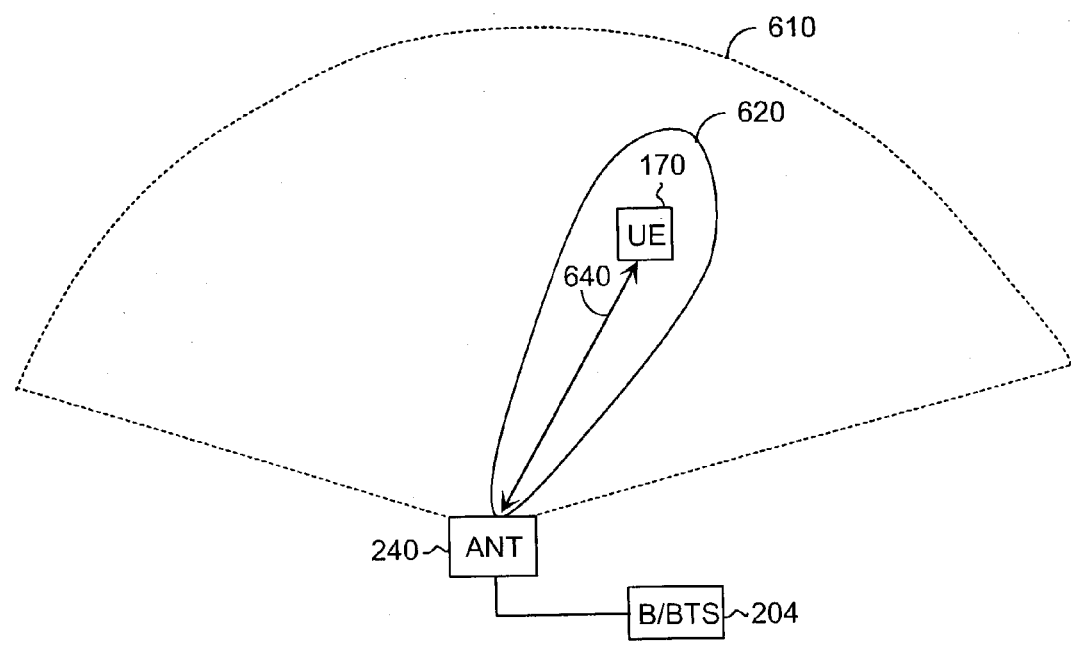
FIG. 6 shows an example of the radiation patterns.

FIG. 6 shows an example of a simple radiation pattern 620, which is directed to the user equipment 170. In this case it is a user-specific radiation pattern or a user-specific antenna beam. In addition, FIG. 6 shows a beam pattern 610 which has fixed direction and which can cover the whole cell. In the example of FIG. 6, it is assumed that the radio environment affects the transmission of the base transceiver station only a little, whereby the user-specific radiation pattern 620 is relatively simple and there is only a small number of signal paths 640.

In orthogonal beam forming each signal 320, 322, 324, 326 can be directed antenna-beam-specifically, whereby the signal 320 can be directed to the user-specific radiation pattern 620, for example, the other signals 322, 324, 326 being directed to other radiation patterns, which are not shown in FIG. 6. The beams do not have to be orthogonal, however. The beams can be directed freely, for instance in such a way that it becomes possible to narrow or shape the beam structure.

The wide antenna beam 610 can be formed by using one or more antenna elements 302, 304, 306, 308 of the antenna array 240. In our example, the phase front of the user-specific radiation pattern 620 is denoted with a broken line 310, the wide antenna beam 610 being formed by using the second antenna element 304. The phase front of the wide antenna beam is indicated by a broken line 312.

Figure 7:
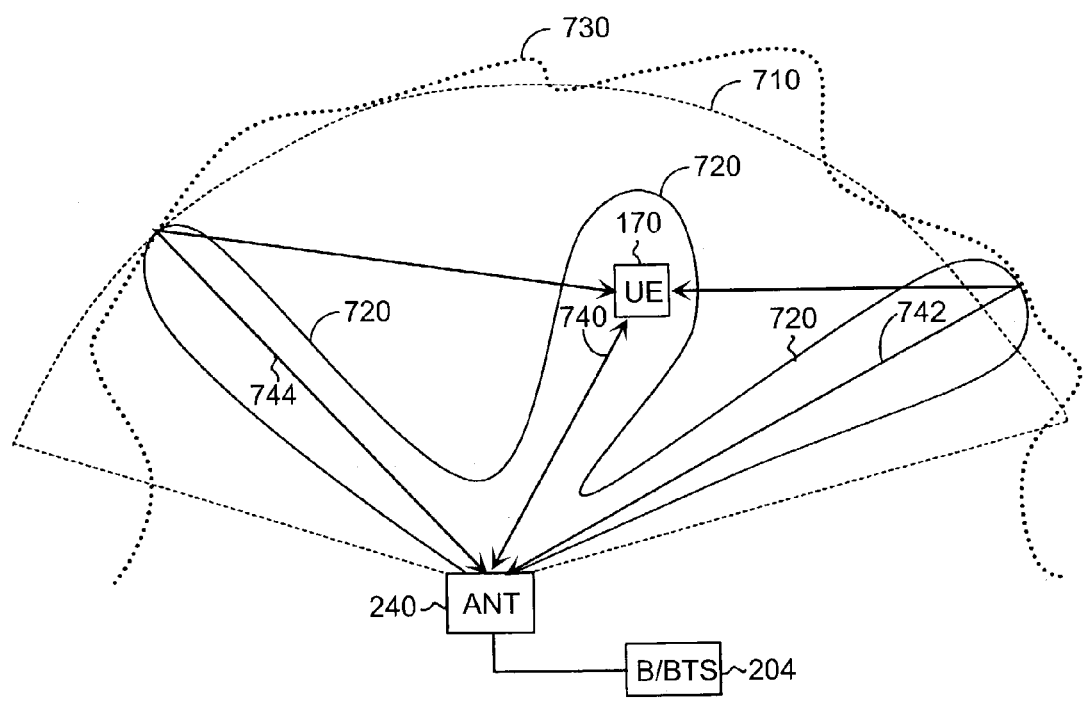
FIG. 7 shows one of the radiation patterns.

FIG. 7 shows an example of a common user-specific radiation pattern 720, the level curve of which forms a multi-beam structure. Multi-beam user-specific radiation patterns 720 are usually formed when the location of a radio environment 730 and of the user equipment 170 requires it. Thus, it is possible to take into account for example the signal reflections and fading in the physical environment of the radio system, and interference caused for and by other radio sources. One example is user equipment of a CDMA-based radio system, which causes multi-access interference that deteriorates the performance of the radio system. In addition, spatial diversity is achieved with a multi-beam radiation pattern. Furthermore, FIG. 7 shows a wide radiation pattern 710 having properties similar to those of the wide radiation pattern 610 of FIG. 6.

With reference to FIGS. 6 and 7, determination of antenna weights used in the formation of a user-specific radiation pattern is now studied.

In one embodiment, determination of antenna weights is based on a signal 640, 740, 742, 744 transmitted by the user equipment 170, the signal being received by antenna elements 302 to 308 of the antenna array 240 of the base transceiver station 204. The base transceiver station 204 determines the strength of the signal received by each antenna element 302, 304, 306, 308, on the basis of which the transmission weights of each antenna element 302, 304, 306, 308 are determined. Determination of transmission weights from the received signal is known as such, and it is not described in more detail in this context. The method is based in the invariance of an electromagnetic wave in time reverse, which means in practise that each of the signals 640, 740, 742, 744 propagates along the same route, irrespective of whether the signal is transmitted from the user equipment 170 or from the base transceiver station 204. Further, it can be assumed that in the FDD-based (FDD, Frequency Division Duplex) technique, the difference between the transmission frequency of the downlink and the transmission frequency of the uplink does not significantly affect the propagation of signals. In the WCDMA system, the signal transmitted by the user equipment 170 can be transmitted in some control channel of the uplink, such as the RACH channel (RACH, Random Access Control Channel).

Also the principle of feedback coupling can be used in determining antenna weights. In such a case, the user equipment 170 receives a signal of the base transceiver station 204 by means of two antennas 422, 424, for example, generates a channel estimate for each signal received by respective antennas 422, 424, and transmits new antenna weights to the base transceiver station 204 by using closed-loop modes of the WCMA system, for example, the new weights corresponding better to the radio environment and the reception of the user equipment 170.

Above, two principles were presented by means of which the user-specific radiation pattern formed by the base transceiver station 204 can be adapted to the radio environment. It will be obvious to a person skilled in the art that the method for forming a user-specific radiation pattern is not as such essential for the solution of the presented solution.

The above-described solution relates to channel estimation performed by the user equipment 170. With reference to FIGS. 6 and 7, the pilot signals used in the channel estimation are now studied.

A pilot signal refers to a signal which is transmitted by a base transceiver station to user equipment and by means of which channel estimation is performed in the user equipment. The pilot signal contains predetermined symbols, in other words the user equipment knows which symbols the pilot signal it has received contains. The pilot signal can also be called a training sequence code or a pilot, for example.

Pilot signals can be classified as common pilot signals and user-specific pilot signals. One type of a common pilot signal is a cell-specific pilot, which typically comprises a primary spreading code and which is transmitted to the radiation pattern 610 covering the cell of the base transceiver station 204. By means of a cell-specific pilot signal, the size of a cell or sector is typically determined, and a cell-specific common pilot can be used by one or more units of user equipment in the area of the base transceiver station cell. In the 3GPP standard, cell-specific pilot signals are transmitted in a primary common pilot channel (P-CPICH). A cell-specific pilot produces a default phase reference for physical channels, such as for the synchronization channel (SCH) and the primary common control physical channel (P-CCPCH).

Another type of a common pilot is a beam-specific common pilot, which is coded not only with spreading codes but also with random, typically 256-bit channel codes. In this case, the user equipment 170 can be configured to use one of the beam-specific common pilots by using a despreading code corresponding to the spreading of the pilot. Beam-specificness means that a common pilot is transmitted to the fixed beam dedicated to the particular pilot, and the same beam-specific pilot can be used by one or more units of user equipment in the area of the particular beam. The beam pattern can, as such, cover the whole cell or part of the cell. Particularly in the 3GPP standard, beam-specific common pilots are transmitted in secondary common pilot channels (S-CPICH). The beam-specific common pilot serves as a phase reference for instance for a downlink dedicated physical channel (DPCH).

It is to be noted that the 3GPP standard allows formation of a secondary common pilot channel (S-CPICH) by using the same scrambling code as is used by the primary common pilot channel (P-CPICH), but a different spreading code. The particular standard also allows the secondary common pilot channel to have a scrambling code different from that of the primary common pilot channel.

The spreading and conversion codings relating to pilot signals can be performed in the digital signal processor of the baseband frequency part of the transceiver of the base transceiver station 204 by using prior art.

User-specific pilot signals are coded user-specifically in such a way that each user-specific pilot signal is used by only a limited number of user equipment 170. User-specific pilots are transmitted with user-specific pilot channels, which are in the 3GPP standard typically mapped to the downlink dedicated physical control channel (DPCCH). The downlink dedicated physical control channel can, in turn, be part of a dedicated physical channel (DPCH), which may also include a downlink dedicated physical data channel (DPDCH). The above-mentioned dedicated channels are characterized in that they involve user-specific coding. In one embodiment, a user-specific pilot signal is transmitted using a user-specific radiation pattern 620, 720. The radiation pattern can also be wide like the radiation patterns 610, 710, but in such a case the pilot signal still involves user-specific coding. A user-specific pilot generates a phase reference in the case of user-specific beam forming, for instance for the downlink dedicated physical channel (DPCH).

The quality of the channel estimation depends, for instance, on the power of the pilot signals used in the channel estimation. Common pilot signals are typically transmitted continuously, and the quality of the channel estimate received from them is usually high. Correspondingly, a user-specific pilot signal is transmitted with time division in a user-specific channel where also other data is transmitted, whereby the transmission power of the pilot signal is lower and the effective power becomes low due to the time division. Roughly, it can be said that the power of a user-specific pilot is about a fifth of the power of a common pilot signal. Thus, the channel estimate for a user-specific channel generated of a user-specific pilot signal can in some cases be of poor quality. However, according to known methods, common pilot signals cannot be used for channel estimation of user-specific channels, because the common pilot channels are transmitted to a radiation pattern different from the one to which the user-specific channels are transmitted. As regards the transmission, this means that in said cases the used antenna configurations and antenna weightings are different. Thus, a channel estimate generated of a common pilot signal does not correspond to a user-specific channel.

Figure 5:
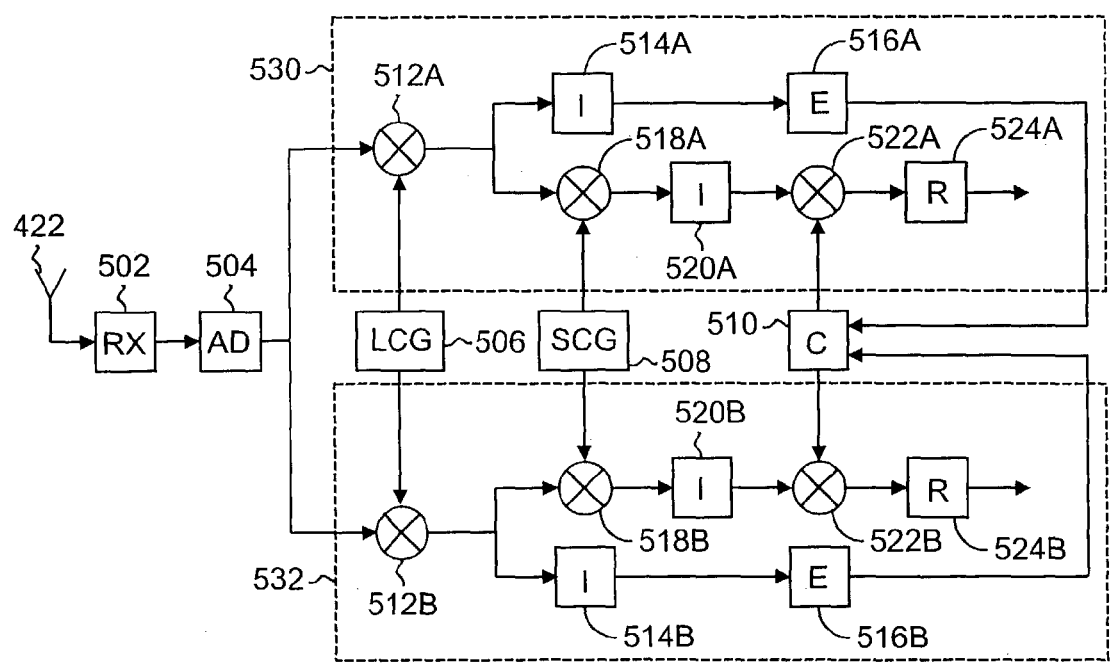
FIG. 5 shows a block diagram of a RAKE receiver of the user equipment.

With reference to FIG. 5, channel estimation performed by the user equipment 170 is now studied. The structure shown in FIG. 5 and the principle of channel estimation can also be applied to establishing adaptive transmission of the base transceiver station 204, for example. Channel estimation can be performed by estimating an impulse response of a pilot signal. FIG. 5 shows as a simplified block diagram interesting parts with respect to the impulse response estimation of a channel of a RAKE receiver of the user equipment 170. In the CDMA system, a RAKE receiver is used for separating multipath-propagated signal components in the reception. Usually, signal components must differ from each other at least by one part, i.e. chip, of the spreading code used. The RAKE receiver comprises RAKE fingers, despreading taking place in each finger. In the RAKE receiver the signals of the different RAKE branches are combined coherently prior to bit detection, with which diversity combination is performed. In addition, the receiver comprises a delay estimator, which has a matched filter per each antenna branch, and an allocation block for RAKE fingers. In the matched filter, the received signal is correlated with different delays with a spreading code used to spread the signal, whereby the timing of the spreading code is changed for example in steps of one chip.

When the correlation is great, a multipath-propagated signal component has been found, which can then be received with a RAKE finger by using the found delay. FIG. 5 does not, for the sake of clarity, show the use of antenna diversity, nor the apparatus parts needed for the allocation of RAKE fingers. In other words, it is assumed that the delay of the signal path has already been found, whereby it has been possible to allocate a RAKE finger to receive a signal.

In the described solution, a common pilot signal is transmitted from the network part 100. In an embodiment, the pilot signal is transmitted cell-specifically in a primary common pilot channel, for example. In another embodiment, the pilot signal is transmitted beam-specifically for example in a secondary common pilot channel, whereby the reception of the pilot signal is preceded by a pilot change command transmitted by the network part 100, according to which command the user equipment 170 is configured to use the specific beam-specific pilot. In the user equipment 170, the common pilot signal and the user-specific pilot signal are received using the antenna element 422. In an embodiment, the user-specific pilot signal and naturally the user-specific channel are transmitted using adaptive transmission, in which case the location of the user equipment 170 and the effects of the radio environment on the transmitted signal have been taken into account in the transmission antenna weights. With adaptive transmission the quality of the user-specific signal is improved and multi-access interference caused for other user equipment is reduced. The term 'adaptivity' can be broadened to refer to any variable used in the radio system, whereby the operation of the radio system is controlled taking into account the prevailing radio environment and the capacity of the radio system.

In an embodiment, pilot signals are received in the user equipment by using at least two antenna elements, such as antenna elements 236 and 238 shown in FIG. 2 The diagram shown in FIG. 5 illustrates a single antenna element 422 that corresponds to each antenna element 236 and 238 in FIG. 2. The received signals are down-converted to complex baseband frequency signals in radio frequency parts 502. The complex baseband frequency signal is then converted to a series of digital samples in an analogue/digital converter 504.

For the sake of simplicity, FIG. 5 shows only two RAKE fingers 530, 532. The first RAKE finger 530 is determined, in our example, to receive the common pilot signal, the second RAKE finger 532 being determined to receive the user-specific pilot signal.

Typically, a RAKE receiver comprises two code generators, a long-code generator 506 and a short-code generator 508. The long code is also known as a scrambling code and the short code as a spreading code. In CDMA-based systems, the radio resource is code-divided between several different users. Each user's payload is spread over a wide frequency band, for example over a five-megahertz frequency band, by multiplying the payload by the spreading code. The receiver can separate the desired signal by multiplying the received signal by the spreading code used for the spreading of the signal. The chips are in fact bits, and the value of a chip can be denoted with zero or one, or as real numbers with one or minus one. Typically, the chip velocity is considerably higher, for example more than a hundred times higher, than the payload velocity. In addition to spreading codes, scrambling codes can be used, by means of which the signal is not necessarily spread any longer, but the bits of the spread signal are scrambled by multiplying each signal bit by a corresponding scrambling code bit. The scrambling codes can be very long, for instance $2^{41}-1$ chips. Code generation is performed with a code generator, for example with a code generator using a linear feedback shift register.

In our example, a suitable long code is taken from the long-code generator 506 to both RAKE fingers 530, 532, more precisely to first multipliers 512A, 512B in them. In the first multiplier 512A, 512B, the received digital samples are multiplied with the complex conjugate of the long code. The signal thus received is taken to a first integrator 514A, 514B and to a second multiplier 518A, 518B. In the second multiplier 518A, 518B, the signal is despread by multiplying the digital samples multiplied by the complex conjugate of the long code by a short code received from the short-code generator 508.

In the first integrator 514A, 514B the received signal processed with the long code is integrated, and in the second integrator 520A, 520B the received signal processed with both the long and the short code is integrated.

From the first integrator 514A, 514B, the signal is taken to a channel estimator 516A, 516B. The channel estimator 516A, 516B estimates the complex channel coefficients by utilizing information contained in the pilot signal. In other words, an impulse response of the common pilot signal is generated in the channel estimator 516A and an impulse response of the user-specific pilot signal is generated in the channel estimator 516B.

It is to be noted that depending on modulation and scrambling/spreading coding of the user-specific pilot signal, the channel estimation generated on the basis of it can differ from the structure of FIG. 5.

The impulse response of the common pilot signal generated by the channel estimator 516A is taken to an impulse response means 510. In the same way, the impulse response of the user-specific pilot signal generated by the channel estimator 516B is taken to the impulse response means 510. In the impulse response means 510, the impulse response of the user-specific channel is generated, based on the impulse response of the common pilot signal or the impulse response of the user-specific pilot signal. In an embodiment, the impulse response of the user-specific channel is generated for each multipath component separately.

In a general case, an impulse response h of a user-specific channel can be expressed as a function $h=h(h_1,h_2)$, where $h_1$ is the impulse response of the pilot signal and $h_2$ is the impulse response of the user-specific pilot signal. In an embodiment, the functional form is $h(h_1,h_2)=h_1+h_2$, but in this case the phase difference between the common pilot signal and the user-specific pilot signal is very small. Such a situation may arise for example when the common pilot signal and the user-specific pilot signal are transmitted with similar transmission weights. Thus, the wave fronts 310 and 312 shown in FIG. 3 are formed similar. A corresponding situation may also arise when the common pilot signal is transmitted from the middlemost antenna element 302 to 308 of the array antenna and the user-specific radiation pattern is directed nearly perpendicularly relative to the plane formed by the antenna elements 302 to 308 of the antenna array. Thus, the wave front 310 is close to the plane formed by the antenna elements 302 to 308.

In an embodiment, a phase factor between the common pilot signal and the user-specific channel is generated, and an impulse response of the user-specific channel is generated, based on the generated phase factor. By means of the phase factor, the impulse response of the pilot signal and the impulse response of the user-specific pilot signal are scaled to the same phase in such a way that the combination of the impulse responses forms the impulse response of the user-specific channel. In other words, the phase factor compensates for the phase difference between the pilot signals having propagated along the same signal path.

In an embodiment, the impulse response of the user-specific channel is generated as a weighted average of the impulse response of the common pilot signal and the impulse response of the user-specific pilot channel, the weighting being based on the generated phase factor. In this case, the impulse response of the user-specific channel can be presented in the form $h=h_2+h_1 \cdot \exp(j\Phi)$, where $\exp(j\Phi)$ is the phase factor. Angle $\Phi$ is the phase difference between the common pilot signal and the user-specific pilot signal.

In an embodiment, the phase factor between the common pilot signal and the pilot signal of the user-specific channel is generated in the network part 100. The phase factor can be determined for example by using antenna weights used in the transmission of the user-specific pilot signal. If antenna weights are not known, a signal of the user equipment 170 is received in the network part 100, a phase factor between the common pilot signal and the user-specific channel is generated in the network part 100 on the basis of the received signal, and the phase factor is signalled from the network part 100 to the user equipment. The network part 100 can perform determination of the antenna weights of the above-described user-specific radiation pattern and calculate the phase factor that is generated with these antenna weights between the user-specific pilot signal to transmitted and, on the other hand, the common pilot signal. The signal of the user equipment 170 can be transmitted in the above-mentioned RACH channel, for example. The phase factor can be transmitted to the user equipment 170 for example in downlink control channels.

In an embodiment, the location information on the user equipment 170 is formed in the network part 100, a phase factor is generated in the network part between the common pilot signal and the pilot signal of the user-specific channel on the basis of the generated location information, and the phase factor is signalled to the user equipment. The location information can be formed in the base transceiver station 204 or in the radio network controller 146. On the basis of the location information, the network part 100 can generate a phase factor, for instance in such a way that the network part 100 comprises a database in which the phase factors between the user-specific radiation patterns 620, 720 directed in given directions and the common pilot signal are stored. The database can also be updated continuously when new location information appears.

In an embodiment, the phase factor between the common pilot signal and the user-specific pilot signal is generated in the user equipment 170. This can be implemented in such a way that the user equipment 170 generates the phase factor by itself by analyzing the received common pilot signals and user-specific pilot signals. This can be implemented in such a way, for example, that the user equipment 170 measures the complex impulse responses of the common pilot signal and the user-specific pilot and calculates the phase factor between these two impulse responses for each RAKE finger separately, using sufficiently long averaging. The effect of quick fading is eliminated with the averaging. The user equipment 170 can also transmit the phase difference information it has collected to the base transceiver station, which, in turn, can in the long run collect statistical data on phase factors between radiation patterns transmitted with different antenna weights. Thus, it becomes possible to adapt to the real environment of each base transceiver station 204. The location information on the user equipment 170 can also be utilized in storing the particular phase factor information. In this way, the base transceiver station 204 can transmit the phase factor information to each new unit of user equipment 170, which enters the area of the particular cell and which has not yet measuring information of its own on the phase factor.

A phase factor between the complex impulse responses of a common pilot signal and a user-specific pilot signal can also be measured as calibration measurement in connection with network set-up. This calibration measurement can be repeated, if required.

In an embodiment, a quality variable of the impulse response of a common pilot channel is generated, a quality variable of the impulse response of a user-specific pilot signal is generated, and an impulse response of a user-specific channel is generated on the basis of the generated quality variables. The quality variables express the reliability of each impulse response, and they can be generated in the same means as the impulse responses. The determination of the impulse responses can utilize for instance transmission power of the pilots, the ratio of the transmission powers and the SINR (Signal-to-Reference Ratio) value determined by the user equipment 170. In an embodiment, the impulse response of the user-specific channel is generated as a weighted average of the impulse response of the common pilot signal and the impulse response of the user-specific pilot signal, the weighting being based on the generated quality variables. In this case, the impulse response of the user-specific channel can be expressed in the form $h=h_2+c \cdot h_1$, where factor c is the weighting coefficient, which depends on said quality variables. The weighting coefficient can be, for instance, the ratio $(SINR)_c/(SINR)_d$, where $(SINR)_c$ is the SINR of the common pilot and $(SINR)_d$ is the SINR of the user-specific pilot. In an embodiment, the weighting used in the weighted average is adjusted adaptively, for instance depending on the cell loading or the radio environment. The practical implementation can be carried out with adaptive adjustment of the weighting coefficient c. The cell loading can be determined in the base transceiver station 204 or in the radio network controller 146. The measurements relating to the radio environment can be performed in the base transceiver station 204 or in the radio network controller 146 and in the user equipment. The information relating to the weighting of the adaptive average and being determined in the base transceiver station 204 or in the radio network controller 146 must first, however, be signalled to the user equipment 170.

From the second integrator 520A, 520B, the signal is taken to a third multiplier 522A, 522B, where the despread pilot signal is multiplied by the complex conjugate of the impulse response of the channel, generated in block 510, in order to remove the phase shift caused by the channel.

The third multiplier 522A, 522B yields the data of the received signal, containing hard bit decisions and possibly soft reliability information. Subsequently, the data is converted to a real signal in a block 524A, 524B.

In the receiver, also channel decoding, deinterleaving and source coding can be performed, but since they are carried out in a known manner, they are not relevant here and therefore not described in more detail.

In order to clarify the structure of FIG. 5, the figure does not show the effects of the multipath propagation of the signal on the structure of the receiver. To take this into account, the user equipment 170 is configured to generate an impulse response of the downlink channel in the described manner for each multipath-propagated component separately. In practice, this means that multipath-propagated components of the common pilot signal are received by a possibly dynamically varying number of RAKE fingers 530. Correspondingly, multipath-propagated components of the user-specific pilot signal are received by a possibly dynamically varying number of RAKE fingers 532. It is to be noted that the number of RAKE fingers 530 for receiving a common pilot signal does not have to be the same as the number of RAKE fingers 532 for receiving a user-specific pilot signal.

The blocks 502 and 504 in FIG. 5 are usually implemented with hardware. The other blocks of FIG. 5 are usually implemented in a digital signal processor with software in the baseband frequency part 430, but also different hardware implementations are feasible, for example a circuit constructed of separate logic components or one or more application-specific integrated circuits (ASIC). Also a combination of these implementations is feasible. When selecting the way of implementation, those skilled in the art will take into account the requirements for the size of the device and for the power consumption, the required processing power, the manufacturing costs and the scale of production.

Figure 8:
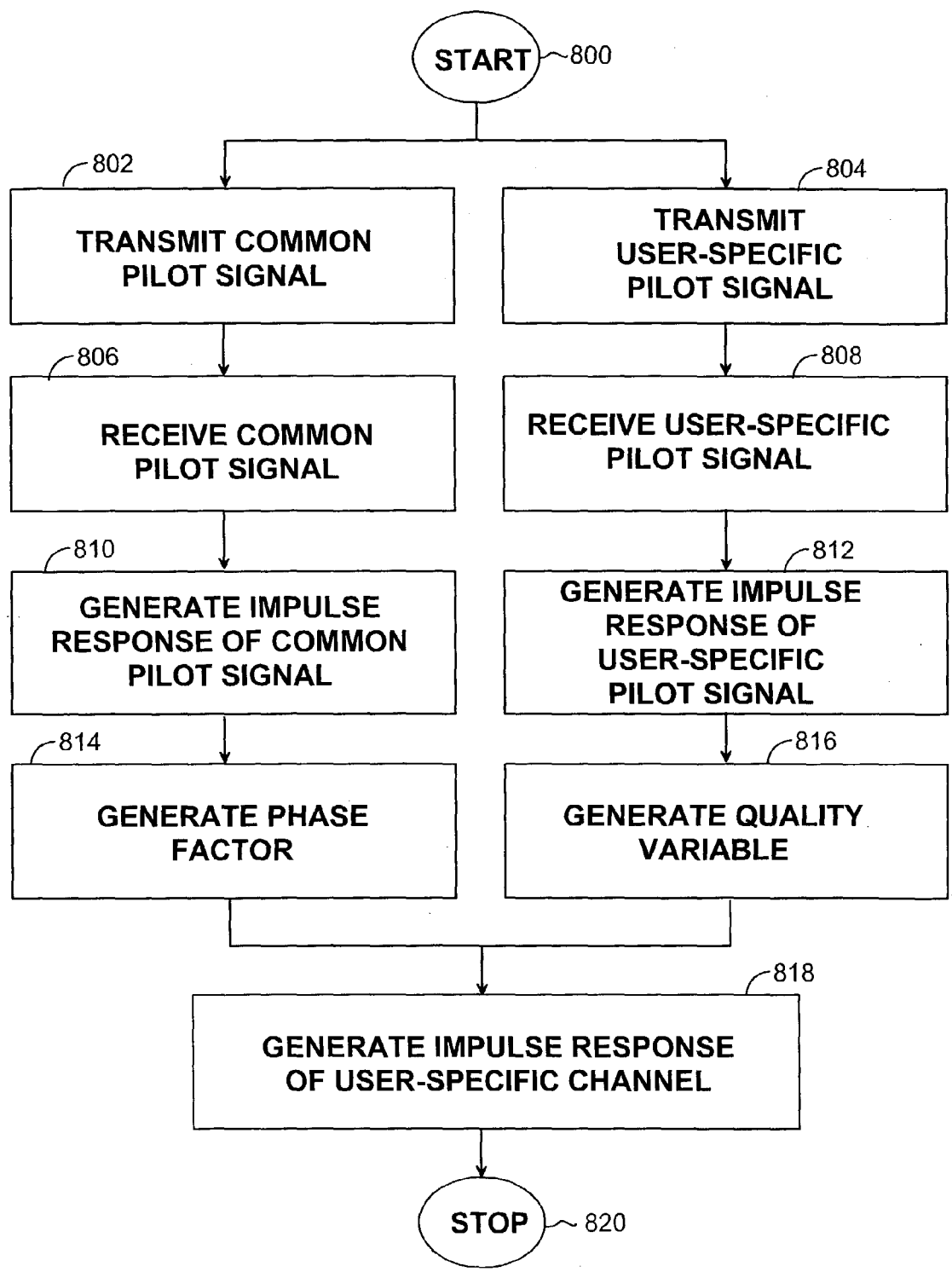
FIG. 8 shows a flow chart illustrating a method of estimating a downlink channel in a radio system.

In the following, a method of estimating a downlink channel in a radio system is described with reference to FIG. 8. Performance of the method is started in 800, then in 802 a common pilot signal is transmitted from the network part 100, and in 804 a user-specific pilot signal is transmitted from the network part 100 in a user-specific channel. After this, in 806, the common pilot signal is received in the user equipment 170, and in 808, the user-specific pilot signal is received in the user equipment 170. Subsequently, an impulse response of the common pilot signal is generated in 810, and an impulse response of the user-specific pilot channel is generated in 812. In the way described in FIG. 8, the steps 802 and 804 can take place simultaneously. Further, the steps 806 and 808 can take place simultaneously. Still further, 810 and 812 can be carried out in parallel to accelerate the calculation. After the above-mentioned steps, an impulse response of the user-specific channel is generated in 818, based on the impulse response of the common pilot signal and the impulse response of the user-specific pilot signal. The performance of the method is terminated in 820.

In an embodiment, the method diagram comprises steps 814 and 816, of which in 814 said phase factor between the pilot signals is generated, and in 816 said quality variables of the impulse responses are generated. The steps 814 and 816 can be performed simultaneously.

User equipment 170 of the above-described type is applicable to the performance of the method, but also other types of equipment may be suitable for implementing the method. Preferred embodiments of the method are those presented in the attached dependent method claims. Their operation has been described above in connection with the user equipment, and therefore the description is not fully repeated here.

Although the invention has been described above with reference to the example according to the attached drawings, it is obvious that the invention is not restricted thereto, but can be modified in a plurality of ways within the inventive idea of the attached claims.

The invention claimed is:

1. A method of estimating a downlink channel in a radio system, the method comprising:
   receiving a common pilot signal in user equipment, the common pilot signal being transmitted antenna-beam-specifically from a network part;
   receiving a user-specific pilot signal in the user equipment, the user-specific pilot signal being transmitted in a user-specific channel from the network part by using a user-specific radiation pattern;
   generating an impulse response of the common pilot signal;
   generating an impulse response of the user-specific pilot signal;
   generating a phase factor between the common pilot signal and the user-specific pilot signal; and
   generating an impulse response of the user-specific channel, based on the impulse response of the common pilot signal, the impulse response of the user-specific pilot signal and the phase factor.

2. A method according to claim 1, wherein the user-specific pilot signal is transmitted by using adaptive transmission.

3. A method according to claim 1, wherein the common pilot signal is received in the user equipment by using at least two antenna elements.

4. A method according to claim 1, wherein a phase factor is generated between the common pilot signal and the pilot signal of the user-specific channel; and an impulse response of the user-specific channel is generated, based on the generated phase factor.

5. A method according to claim 1, wherein a quality variable of the impulse response of the common pilot signal is generated;
   a quality variable of the impulse response of the user-specific pilot signal is generated; and
   an impulse response of the user-specific channel is generated, based on the generated quality variables.

6. A method according to claim 1, wherein a phase factor is generated between the common pilot signal and the pilot signal of the user-specific channel; and
   an impulse response of the user-specific channel is generated as a weighted average of the impulse response of the common pilot signal and the user-specific pilot signal, where the weighting is based on the generated phase factor.

7. A method according to claim 1, wherein a quality variable of the impulse response of the common pilot signal is generated;
   a quality variable of the impulse response of the user-specific pilot signal is generated; and
   an impulse response of the user-specific channel is generated as a weighted average of the impulse response of the common pilot signal and the impulse response of the user-specific pilot signal, the weighting being based on the generated quality variables.

8. A method according to claim 1, wherein in the network part a phase factor is generated between the common pilot signal and the user-specific pilot signal;
   the phase factor is signalled to the user equipment; and
   in the user equipment an impulse response of the user-specific channel is generated, based on the generated phase factor.

9. A method according to claim 1, wherein in the network part a signal of the user equipment is received;
   in the network part a phase factor is generated between the common pilot signal and the pilot signal of the user-specific channel, based on the received signal;
   the phase factor is signalled from the network part to the user equipment; and
   in the user equipment an impulse response of the user-specific channel is generated, based on the generated phase factor.

10. A method according to claim 1, wherein position information on the user equipment is generated in the network part;
    in the network part a phase factor is generated between the common pilot signal and the pilot signal of the user-specific channel, based on the generated position information;
    the phase factor is signalled from the network part to the user equipment; and
    in the user equipment an impulse response of the user-specific channel is generated, based on the generated phase factor.

11. A method according to claim 1, wherein in the user equipment a phase factor is generated between the common pilot signal and the user-specific pilot signal; and
    in the user equipment an impulse response of the user-specific channel is generated, based on the generated phase factor.

12. A method according to claim 1, wherein in the user equipment an impulse response of the user-specific channel is generated as a weighted average of the impulse response of the common pilot signal and the impulse response of the user-specific pilot, the weighting being adjusted adaptively.

13. A method according to claim 1, wherein an impulse response of the user-specific channel is generated for each multipath component separately.

14. A method according to claim 1, wherein an impulse response h of the user-specific channel is generated with formula $$h = h_2 + c \cdot h_1 \cdot \exp(j\Phi), \text{ where}$$

$h_1$ is an impulse response of the common pilot signal;
   $h_2$ is an impulse response of the user-specific pilot signal;
   c is a weighting coefficient; and
   $\exp(j\Phi)$ is the phase factor, where $\Phi$ is the phase difference between the common pilot signal and the user-specific pilot signal.

15. A radio system, comprising:
    a network part for forming a fixed infrastructure for the radio system;
    user equipment for forming a mobile infrastructure for the radio system;
    the network part comprising means for transmitting a common pilot antenna-beam-specifically;
    the network part comprising means for transmitting a user-specific pilot signal in a user-specific channel by using a user-specific radiation pattern;
    the user equipment comprising means for generating an impulse response of the common pilot channel;
    the user equipment comprising means for generating an impulse response of the user-specific pilot signal;
    the network part comprising means for generating a phase factor between the common pilot signal and the user-specific pilot signal the user equipment further comprising:
impulse response means for generating an impulse response of the user-specific channel, based on the impulse response of the common pilot signal, the impulse response of the user-specific pilot signal and the phase factor between the common pilot and the user-specific pilot signal.

16. A radio system according to claim 15, wherein the network part comprises means for transmitting a signal adaptively.

17. A radio system according to claim 15, wherein the impulse response means are arranged to generate an impulse response of the user-specific channel as a weighted average of the impulse response of the common pilot signal and the impulse response of the user-specific pilot signal, the weighting being based on a phase factor between the common pilot signal and the user-specific pilot signal.

18. A radio system according to claim 15, wherein the means for generating an impulse response of the common pilot channel are arranged to generate a quality variable of the impulse response of the common pilot signal; and
means for generating an impulse response of the user-specific pilot signal are arranged to generate a quality variable of the impulse response of the user-specific pilot signal.

19. A radio system according to claim 15, wherein the impulse response means are arranged to generate an impulse response of the user-specific channel, based on a quality variable of the impulse response of the common pilot signal and a quality variable of the impulse response of the user-specific pilot signal.

20. A radio system according to claim 15, wherein the impulse response means are arranged to generate an impulse response of the user-specific channel as a weighted average of the impulse response of the common pilot signal and the impulse response of the user-specific pilot signal, the weighting being based on a quality variable of the impulse response of the common pilot signal and a quality variable of the impulse response of the user-specific pilot signal.

21. A radio system according to claim 15, wherein the network part comprises means for signaling a phase factor between the common pilot signal and the user-specific pilot signal to the user equipment.

22. A radio system according to claim 15, wherein the network part comprises means for receiving a signal of the user equipment; and
the network part comprises means for generating a phase factor between the common pilot signal and the user-specific pilot signal, based on the received signal.

23. A radio system according to claim 15, wherein the network part comprises means for generating position information on the user equipment;
the network part comprises means for generating a phase factor between the common pilot signal and the pilot signal of the user-specific channel, based on the generated position information.

24. A radio system according to claim 15, wherein the user equipment comprises means for generating an impulse response of each multipath component separately.

25. A radio system according to claim 15, wherein the impulse response means are arranged to generate an impulse response h of the user-specific channel with formula $h = h_2 + c \cdot h_1 \cdot \exp(j\Phi)$, where $h_1$ is an impulse response of the common pilot signal;
$h_2$ is an impulse response of the user-specific pilot signal,
c is a weighting coefficient; and
$\exp(j\Phi)$ is the phase factor, where $\Phi$ is the phase difference between the common pilot signal and the user-specific pilot signal.

26. A radio system according to claim 15, wherein the impulse response means are arranged to generate an impulse response of the user-specific channel as a weighted average of the impulse response of the common pilot signal and the impulse response of the user-specific pilot signal, the weighting taking place adaptively.

27. A user equipment of a radio system, comprising:
a receiver for receiving a common pilot signal, the common pilot signal being transmitted antenna-beam-specifically from a network part, wherein the receiver is configured to receive a user-specific pilot signal, the user-specific pilot signal being transmitted in a user-specific channel from the network part by using a user-specific radiation pattern;
a channel estimator for generating an impulse response of the common pilot signal, wherein the channel estimator is configured to generate an impulse response of the user-specific pilot signal;
phase factor means for generating a phase factor between the common pilot signal and the user-specific pilot signal; and
impulse response means for generating an impulse response of the user-specific channel, based on the impulse response of the common pilot signal, the impulse response of the user-specific pilot signal and the phase factor.

28. A user equipment of a radio system, comprising:
a receiver for receiving a common pilot signal, the common pilot signal being transmitted antenna-beam-specifically from a network part, wherein the receiver is configured to receive a user-specific pilot signal, the user-specific pilot signal being transmitted in a user-specific channel from the network part by using a user-specific radiation pattern;
a channel estimator for generating an impulse response of the common pilot signal, wherein the channel estimator is configured to generate an impulse response of the user-specific pilot signal;
phase factor device configured to generate a phase factor between the common pilot signal and the user-specific pilot signal; and
impulse response device configured to generate an impulse response of the user-specific channel, based on the impulse response of the common pilot signal, the impulse response of the user-specific pilot signal and the phase factor.

* * * * *